United States Patent
Tsotsis

(10) Patent No.: US 9,683,312 B2
(45) Date of Patent: Jun. 20, 2017

(54) FIBER WITH GRADIENT PROPERTIES AND METHOD OF MAKING THE SAME

(75) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 13/316,504

(22) Filed: Dec. 10, 2011

(65) Prior Publication Data

US 2013/0149522 A1 Jun. 13, 2013

(51) Int. Cl.
| | |
|---|---|
| *B32B 5/02* | (2006.01) |
| *D01F 8/04* | (2006.01) |
| *D01D 5/34* | (2006.01) |
| *D01F 9/14* | (2006.01) |
| *D01F 1/10* | (2006.01) |
| *D01F 8/00* | (2006.01) |

(52) U.S. Cl.
CPC ............. *D01F 9/14* (2013.01); *D01F 1/10* (2013.01); *D01F 8/00* (2013.01); *Y10T 428/24994* (2015.04); *Y10T 428/2916* (2015.01); *Y10T 428/2918* (2015.01); *Y10T 428/2929* (2015.01)

(58) Field of Classification Search
CPC ..... D01F 1/10; D01F 8/00; D01F 8/04; D01F 1/09; Y10T 428/2929; Y10T 428/24994; Y10T 428/2916; Y10T 428/2918; Y10T 442/3154
USPC ..... 428/373, 297.4, 366, 367; 442/200, 364, 442/641; 977/742
See application file for complete search history.

(56) References Cited

U.S. PATENT DOCUMENTS

| | | |
|---|---|---|
| 3,677,705 A | 7/1972 | Ram et al. |
| 4,208,267 A | 6/1980 | Diefendorf et al. |
| 4,277,324 A | 7/1981 | Greenwood |
| 5,021,497 A | 6/1991 | Ohara et al. |
| 5,032,250 A | 7/1991 | Romine et al. |
| 5,602,222 A | 2/1997 | Smierciak et al. |

(Continued)

FOREIGN PATENT DOCUMENTS

| | | |
|---|---|---|
| CN | 101768791 A | 7/2010 |
| EP | 0421944 A2 | 4/1991 |

(Continued)

OTHER PUBLICATIONS

Kumar, Satish, Functional Polymer—Polymer/Carbon Nanotube Bi-Component Fibers, Nov. 2010, National Textile Center Annual Report, pp. 1-10.*

(Continued)

*Primary Examiner* — Camie Thompson

(57) ABSTRACT

There is provided a fiber and method of making a fiber. The fiber has an inner-volume portion having a first outer diameter, a plurality of nanostructures, and one or more first polymers. The nanostructures act as an orientation template for orientation of the one or more first polymers in a direction parallel to a longitudinal axis of the fiber. The fiber has an outer-volume portion having a second outer diameter and one or more second polymers. The outer-volume portion is in contact with and completely encompasses the inner-volume portion. The inner-volume portion has at least one of a tensile modulus and a strength that are higher than at least one of a tensile modulus and a strength of the outer-volume portion.

16 Claims, 9 Drawing Sheets

(56) References Cited

U.S. PATENT DOCUMENTS

| | | | |
|---|---|---|---|
| 5,618,901 A | | 4/1997 | Smierciak et al. |
| 5,821,012 A | | 10/1998 | McCullough |
| 5,902,530 A | | 5/1999 | Jorkasky et al. |
| 6,852,410 B2 | * | 2/2005 | Veedu ............... D01F 1/09 |
| | | | 428/367 |
| 7,273,652 B2 | | 9/2007 | Takeda et al. |
| 7,875,801 B2 | | 1/2011 | Tsotsis |
| 7,875,802 B2 | | 1/2011 | Tsotsis |
| 7,897,876 B2 | | 3/2011 | Tsotsis et al. |
| 7,938,996 B2 | | 5/2011 | Baughman et al. |
| 8,043,520 B2 | | 10/2011 | Asakawa et al. |
| 2005/0100501 A1 | | 5/2005 | Veedu et al. |
| 2008/0286564 A1 | | 11/2008 | Tsotsis |
| 2010/0120969 A1 | * | 5/2010 | Tsotsis ................... 524/496 |
| 2010/0173105 A1 | | 7/2010 | Tsotsis et al. |
| 2010/0272978 A1 | * | 10/2010 | Kumar ............... D01F 1/10 |
| | | | 428/220 |
| 2011/0262730 A1 | | 10/2011 | Tsotsis |

FOREIGN PATENT DOCUMENTS

| | | | | |
|---|---|---|---|---|
| JP | 10088430 A | * | 4/1998 | ............ D01F 9/14 |
| JP | 2006137869 A | | 6/2006 | |
| JP | 2009185425 A | | 8/2009 | |
| WO | 2007103422 A1 | | 9/2007 | |
| WO | 2008112349 A2 | | 9/2008 | |
| WO | 2009049174 A1 | | 4/2009 | |
| WO | WO 2009049174 A1 | * | 4/2009 | ............ H01B 1/24 |
| WO | WO2009049174 A1 | | 4/2009 | |
| WO | 2010136729 A1 | | 12/2010 | |
| WO | WO2010136729 A1 | | 12/2010 | |
| WO | WO2010-136729 | * | 12/2012 | |

OTHER PUBLICATIONS

Yuris A. Dzenis, "Spinning Continuous Fibers for Nanotechnology", Faculty Publications from the Department of Engineering Mechanics of the University of Nebraska, 2004, 4 pages.

An-Ting Chien et al., "Functional Polymer-Polymer/Carbon Nanotube Bi-component Fibers", Georgia Institute of Technology, Oct. 2011, 1 page poster.

Han Gi Chae et al., "Stabilization and Carbonization of Gel Spun Polyacrylonitrile/Single Wall Carbon Nanotube Composite Fibers", Polymer, Elsevier Science Publishers B.V., GB, vol. 48, No. 13, Jun. 5, 2007, pp. 3781-3789.

Byung Gil Min et al., "Polymer/Carbon Nanotube Composite Fibers—An Overview" in Functional Composites of Carbon Nanotubes and Applications, Transworld Research Network, Kerala, India, Dec. 31, 2009, pp. 43-73.

PCT International Search Report and Written Opinion of the International Searching Authority, Mailed Feb. 4, 2013, for the Boeing Company Counterpart International Application No. PCT/US2012/061480, filed Oct. 23, 2012, 14 pages.

PCT Notification Concerning Transmittal of International Preliminary Report on Patentability and Written Opinion of the International Searching Authority for Counterpart International Application No. PCT/US2012/061480, Mailed Jun. 19, 2014, Applicant The Boeing Company, 11 pages.

Chae et al., "Stabilization and Carbonization of Gel Spun Polyacrylonitrile/Single Wall Carbon Nanotube Composite Fibers", Polymer, vol. 48, No. 13, Jun. 5, 2007, pp. 3781-3789, XP022105811.

Min et al., "Polymer/carbon nanotube composite fibers—An overview", Functional Composites of Carbon Nanotubes and Applications, 2009, Transworld Research Network, Trivandrum, Kerala, India, XP055050925, ISBN:978-8-17-895413-4, pp. 43-73.

European Patent Office (EPO) Examination Report for Counterpart EP Application No. 12194048.0, Mailed Jun. 18, 2015, Applicant The Boeing Company, 5 pages, of related U.S. Appl. No. 13/316,506.

State Intellectual Property Office (SIPO) of the P.R.C., Notification of First Office Action and Search Report, Issued Dec. 25, 2015, for related Chinese Application No. 201210530067.7 related to U.S. Appl. No. 13/316,506, The Boeing Company, 17 pages.

* cited by examiner

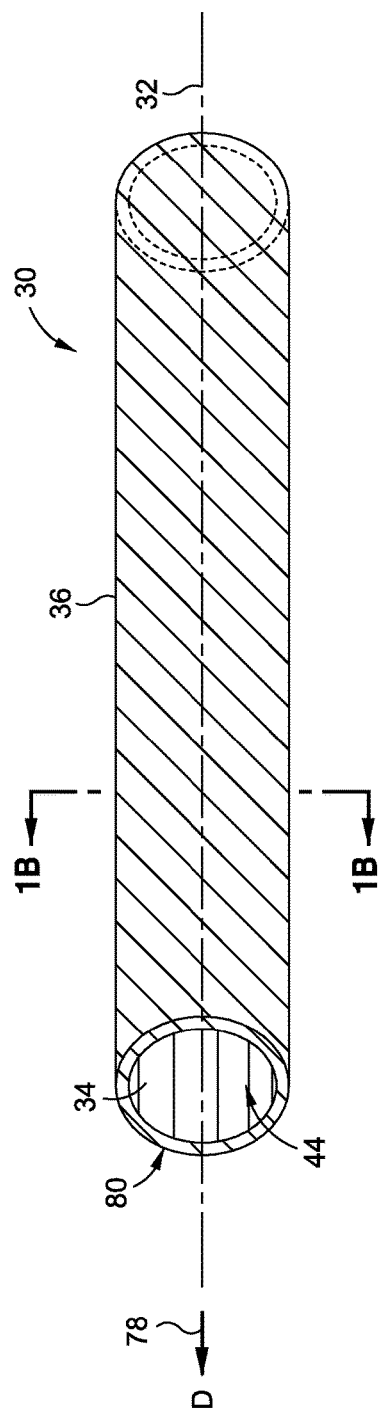
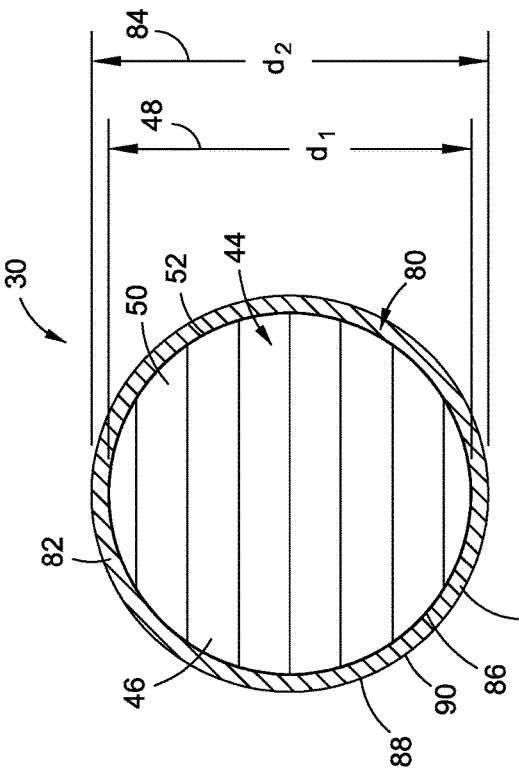
FIG. 1A
FIG. 1B

FIBER WITH GRADIENT PROPERTIES AND METHOD OF MAKING THE SAME

BACKGROUND

1) Field of the Disclosure

The disclosure relates generally to fibers with nanostructure reinforcement, and more particularly, to core-sheath carbon fibers with core nanostructure reinforcement and gradient properties for use in composite structures for aircraft and other structures.

2) Description of Related Art

Fiber-reinforced resin materials, or "composite" materials as they are commonly known, are used in a wide variety of structures and component parts, including in the manufacture of aircraft, spacecraft, rotorcraft, watercraft, automobiles, trucks, and other vehicles, because of high strength-to-weight ratios, corrosion resistance, and other favorable properties. In particular, in aircraft construction, composite structures and component parts are used in increasing quantities to form the fuselage, wings, tail section, skin panels, and other component parts of the aircraft.

Conventional composite materials typically include glass, carbon, or polyaramid fiber "plies" in woven and/or non-woven configurations. The fiber plies can be manufactured into composite parts by laminating them together with an uncured matrix material (e.g., an epoxy resin). The laminate can then be cured with the application of heat and/or pressure to form the finished part.

The fiber material in composite parts provides relatively high strength in the direction of the fibers. Impact resistance, however, is generally determined by the properties of the cured matrix. Carbon fibers with high moduli and strengths may have issues at the fiber-matrix interface when there is a mismatch between the stiffness of the matrix and the fiber. Known composite materials exist with higher moduli and strengths than currently used high-to-intermediate-modulus fibers. However, such known composite materials have shown a susceptibility to decreased interface properties between the fiber and matrix, thus limiting the benefits available from such higher-performance fibers. In addition, known methods exist that either modify the fiber sizing or use different matrix chemistries. However, such known methods may not overcome the susceptibility to decreased interface properties between the fiber and matrix while still providing improved fiber properties. Moreover, such known methods may increase the weight of the composite materials and may increase costs of manufacturing and production of the composite materials.

Further, another way to increase the impact resistance and fracture toughness of composite parts is to enhance the structural properties of the composite materials by adding nanostructures, such as carbon nanostructures, to the composite materials. Carbon nanotubes are ordered molecules of pure carbon which form very small cylinders (on the order of 10 nanometers (i.e., $1 \times 10^{-8}$ meters)). Carbon nanotubes exhibit unusual strength, and may be over 30 times as strong as typical carbon fibers and 100 times stronger than steel of equivalent weight.

Known composite materials having nanostructure reinforcement, such as carbon nanotube reinforcement, exist. However, such known composite materials may suspend the carbon nanotubes in resin resulting in random orientation of the nanotubes between adjacent fiber plies. Moreover, the addition of even small amounts of carbon nanotubes to a liquid resin tends to dramatically increase its viscosity and, thus, decrease its processability. Further, conventionally produced carbon fibers typically used in aerospace composite materials and other composite materials may have amorphous microstructures in the core of the fiber and ordered, graphitic structures in the outer portion of the fiber, which may result in substantial strength and stiffness from such fibers being derived from the outer portion of the fiber.

Accordingly, there is a need in the art for an improved fiber with more-tailorable properties for use in composite materials and a method of making the same that provide advantages over known materials and methods.

SUMMARY

This need for an improved fiber with more-tailorable properties for use in composite materials and a method of making the same is satisfied. As discussed in the below detailed description, embodiments of the improved fiber with more-tailorable properties and a method of making the same may provide significant advantages over known materials and methods.

In an embodiment of the disclosure, there is provided a fiber comprising an inner-volume portion having a first outer diameter and having a plurality of nanostructures and one or more first polymers. The nanostructures act as an orientation template for orientation of the one or more first polymers in a direction parallel to a longitudinal axis of the fiber. The fiber further comprises an outer-volume portion having a second outer diameter and having one or more second polymers. The outer-volume portion is preferably in contact with and completely encompasses the inner-volume portion. The inner-volume portion has at least one of a tensile modulus and a strength that are higher than at least one of a tensile modulus and a strength of the outer-volume portion.

In another embodiment of the disclosure, there is provided a fiber. The fiber comprises an inner core portion having a plurality of carbon nanotubes and a plurality of first polymers. The carbon nanotubes act as an orientation template for orientation of the plurality of the first polymers in a direction parallel to a longitudinal axis of the fiber. The fiber further comprises an outer sheath portion having a plurality of second polymers. The outer sheath portion is preferably in contact with and cylindrically encompasses the inner core portion. The inner core portion has at least one of a tensile modulus and a strength that are higher than at least one of a tensile modulus and a strength of the outer sheath portion.

In another embodiment of the disclosure, there is provided a composite part. The composite part comprises a plurality of carbon-based fibers. At least one of the carbon-based fibers comprises an inner-volume portion having a first outer diameter and having a plurality of nanostructures and one or more first polymers. The nanostructures act as an orientation template for orientation of the one or more first polymers in a direction parallel to a longitudinal axis of the carbon-based fiber. The at least one carbon-based fiber further comprises an outer-volume portion having a second outer diameter and having one or more second polymers. The outer-volume portion is preferably in contact with and completely encompasses the inner-volume portion. The inner-volume portion has at least one of a tensile modulus and a strength that are higher than at least one of a tensile modulus and a strength of the outer-volume portion. The composite part further comprises a resin matrix cured to the plurality of carbon-based fibers.

In another embodiment of the disclosure, there is provided a method of making a fiber having improved resistance to microfracture formation at a fiber-matrix interface.

The method comprises mixing a plurality of nanostructures and one or more first polymers in a first solvent to form an inner-volume portion mixture. The method further comprises mixing one or more second polymers in a second solvent to form an outer-volume portion mixture. The method further comprises spinning the inner-volume portion mixture and the outer-volume portion mixture to form a precursor fiber. The method further comprises heating the precursor fiber to oxidize the precursor fiber and to change a molecular-bond structure of the precursor fiber. The method further comprises obtaining a fiber comprising an inner-volume portion with a first outer diameter, the nanostructures, and with the one or more first polymers being oriented in a direction parallel to a longitudinal axis of the fiber. The fiber further comprises an outer-volume portion with a second outer diameter and the one or more second polymers. The outer-volume portion is preferably in contact with and completely encompasses the inner-volume portion. The inner-volume portion has at least one of a tensile modulus and a strength that are higher than at least one of a tensile modulus and a strength of the outer-volume portion, resulting in the fiber having an improved resistance to microfracture formation at a fiber-matrix interface. The method further optionally comprises curing a resin matrix to a plurality of the fibers to form a composite part.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1A is an illustration of a perspective schematic view of one of the embodiments of a fiber of the disclosure;

FIG. 1B is an illustration of a cross-section taken along lines 1B-1B of the fiber of FIG. 1A;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 2:
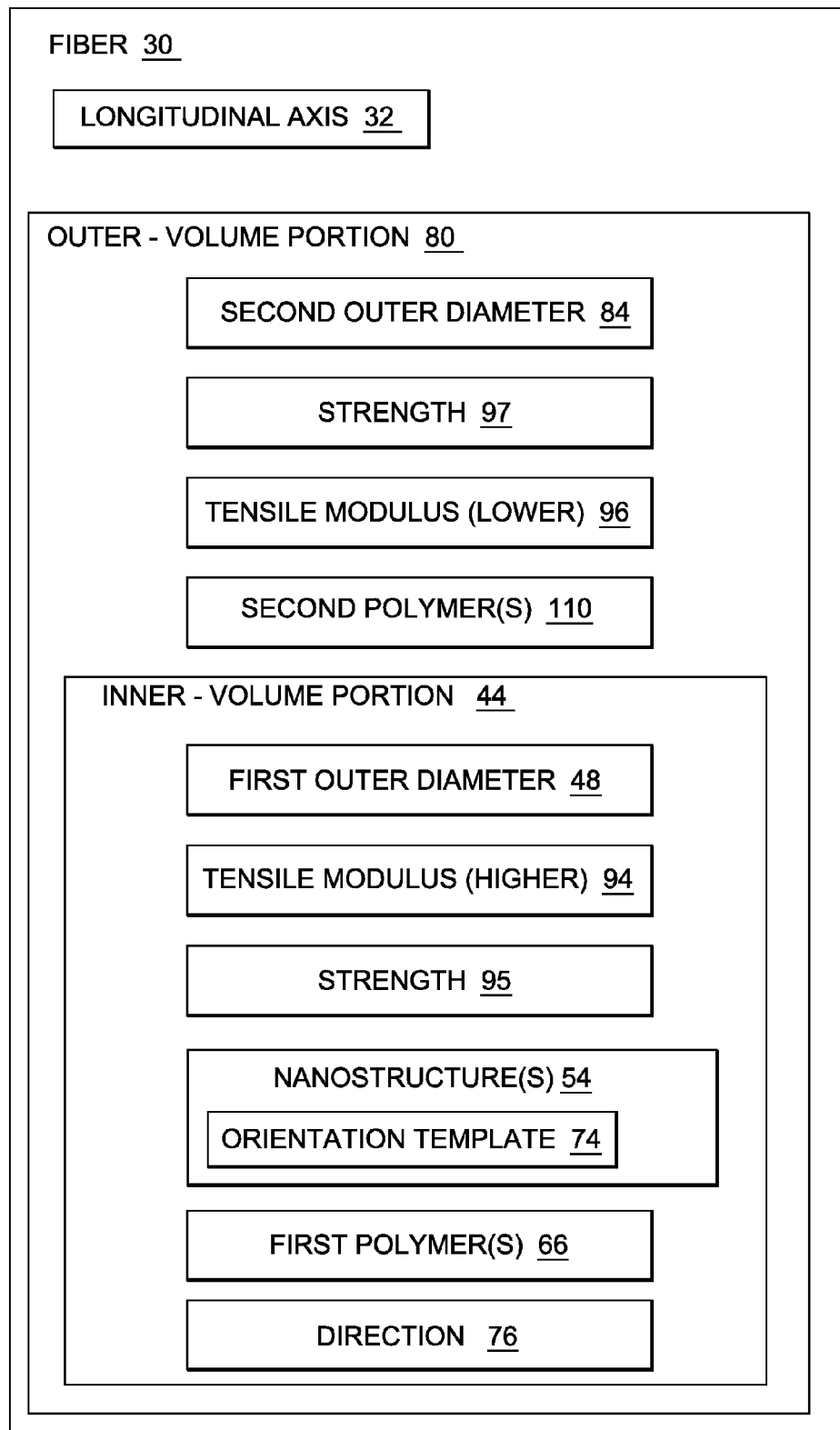
FIG. 2 is an illustration of a block diagram of one of the embodiments of a fiber of the disclosure.
Figure 3:
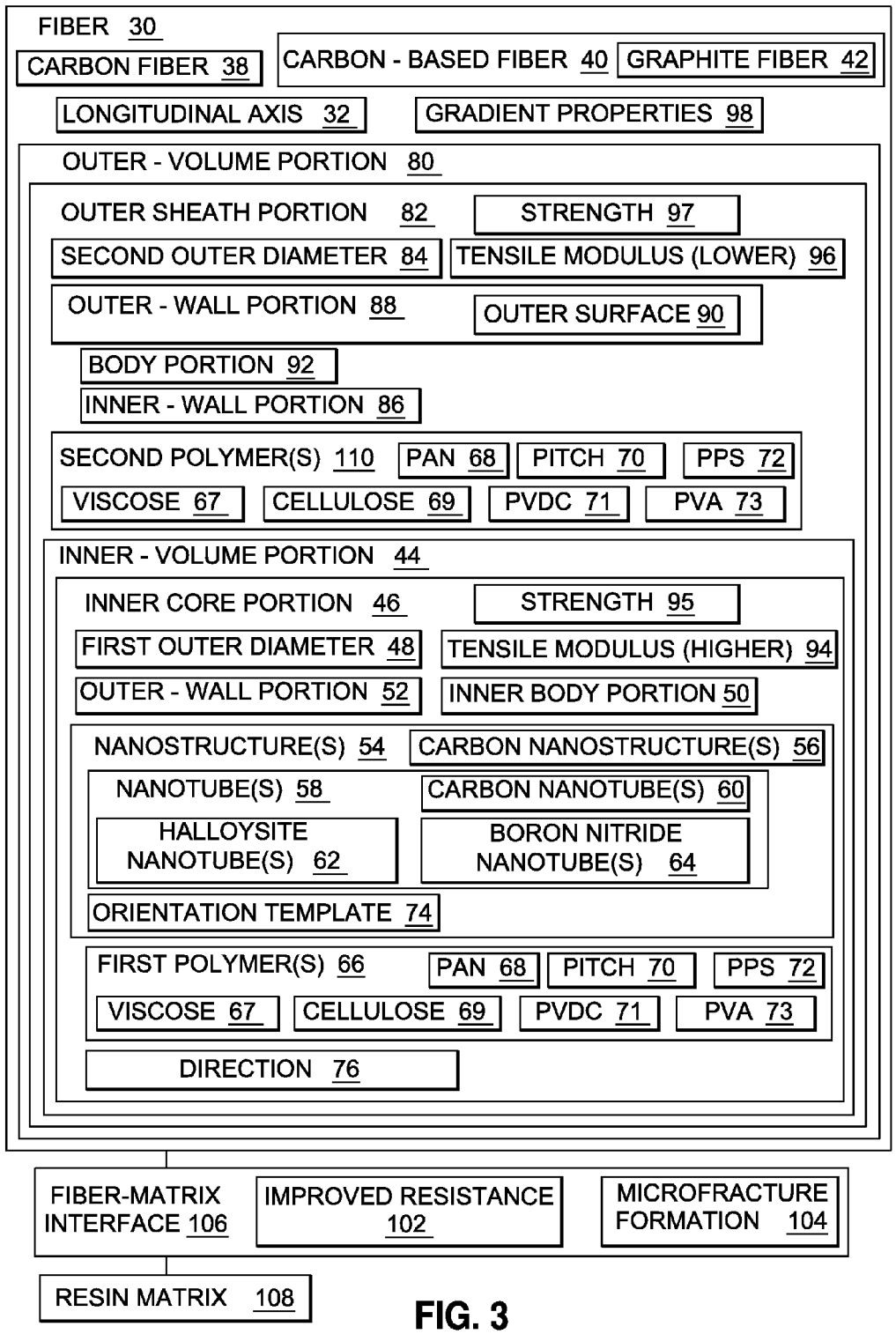
FIG. 3 is an illustration of a block diagram of another one of the embodiments of a fiber of the disclosure.

Now referring to the Figures, in an embodiment of the disclosure, as shown in FIGS. 1A-1B, there is provided a fiber 30. FIG. 1A is an illustration of a perspective schematic view of one of the embodiments of the fiber 30 of the disclosure. FIG. 1B is an illustration of a cross-section taken along lines 1B-1B of the fiber 30 of FIG. 1A. FIG. 2 is an illustration of a block diagram of one of the embodiments of the fiber 30 of the disclosure. FIG. 3 is an illustration of a block diagram of another one of the embodiments of a fiber 30 of the disclosure.

The term "fiber" as used herein means both fibers of finite length, such as known staple fibers, as well as substantially continuous structures, such as filaments, unless otherwise indicated. As shown in FIG. 1A, the fiber 30 has a longitudinal axis 32 that runs the length of the fiber 30. The fiber 30 is preferably continuous and preferably has a solid structure 34 (see FIG. 1A) rather than being hollow. As shown in FIG. 1A, the fiber 30 preferably has a cylindrical or tubular configuration 36 or another suitable configuration. The fiber 30 preferably comprises a carbon fiber 38 (see FIG. 3), a carbon-based fiber 40 (see FIG. 3) such as a graphite fiber 42 (see FIG. 3), or another suitable fiber.

As shown in FIG. 1B, the fiber 30 comprises an inner-volume portion 44, preferably in the form of an inner core portion 46 (see also FIG. 3). As shown in FIG. 1B, the inner-volume portion 44 comprises a first outer diameter ($d_1$) 48. The first outer diameter ($d_1$) 48 may preferably range in length from about 2 micrometers to about 50 micrometers; may more preferably range from about 5 micrometers to about 10 micrometers; or may most preferably range about 5 micrometers to about 7 micrometers, or may have another suitable length. As shown in FIG. 1B, the inner-volume portion 44 further comprises an inner body portion 50 and an outer-wall portion 52 surrounding the inner body portion 50.

The inner-volume portion 44 further comprises one or more nanostructure(s) 54 or a plurality of nanostructures 54 (see FIG. 2). The nanostructure(s) 54 may preferably comprise carbon nanostructure(s) 56 (see FIG. 3), nanotube(s) 58 (see FIG. 3), carbon nanotube(s) 60 (see FIG. 3), halloysite nanotube(s) 62 (see FIG. 3), boron nitride nanotube(s) 64 (see FIG. 3), or another suitable nanostructure that promotes templating of a precursor polymer. Preferably, the nanostructure(s) 54 are nanotube(s) 58, and more preferably, the nanostructure(s) 54 are carbon nanotube(s) 60. The nanotube(s) 58, such as carbon nanotube(s) 60, that may be used may comprise single-wall, double-wall, or multi-wall structures. Single-wall carbon nanotubes may be made from any known method, such as by gas-phase synthesis from high-temperature, high-pressure carbon monoxide, catalytic vapor deposition using carbon-containing feedstocks and metal catalyst particles, laser ablation, arc method, or any other method for synthesizing single-wall carbon nanotubes. The single-wall carbon nanotubes obtained from synthesis are generally in the form of single-wall-carbon-nanotube powder, which may also be supplied as a dispersion or suspension in a liquid, such as dimethyl acetamide (DMAc), dimethyl formamide (DMF), or another suitable fluid. The inner-volume portion 44 may comprise a percentage of nanostructure content, such as nanotube content, preferably ranging in an amount of from about 0.01% by weight to about 10% by weight; more preferably ranging in an amount of from about 0.01% by weight to about 5% by weight; and most preferably ranging in an amount of from about 0.1% by weight to about 1% by weight. The nanotubes 58 are preferably substantially aligned along the longitudinal axis 32 (see FIG. 1A) of the fiber 30.

The inner-volume portion 44 further comprises one or more first polymer(s) 66 (see FIGS. 2-3). As shown in FIG. 3, the first polymer 66 preferably comprises a polymer such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer.

As used herein, the term "polyacrylonitrile (PAN)" polymer includes polymers comprising at least about 85% by weight acrylonitrile units (generally known in the art as acrylic or polyacrylonitrile polymers). This term as used herein also includes polymers which have less that 85% by weight acrylonitrile units. Such polymers include modacrylic polymers, generally defined as polymers comprising from about 35% by weight to about 85% by weight acrylonitrile units and typically copolymerized with vinyl chloride or vinylidene chloride. Preferably, the polyacrylonitrile polymer has at least 85% by weight polyacrylonitrile units. Other polymers known in the art to be suitable precursors for carbon and graphite fibers, such as polyvinyl alcohol, aromatic polyamides, or poly(acetylenes), may be suitable, if capable of extrusion by melt spinning.

Exemplary melt-processable polyacrylonitriles are described in U.S. Pat. Nos. 5,602,222, 5,618,901 and 5,902,530, the entire disclosure of each of which is hereby incorporated by reference. Such polymers are commercially available, for example, from BP Chemicals Inc., as BAREX acrylic polymers (BAREX is a registered trademark of BP Chemicals Inc. of Cleveland, Ohio), and the like.

Melt-processable/spinnable PANs are particularly preferred because they are excellent precursors for the formation of carbon fibers. In addition, melt-processable PANs exhibit adequate heat resistance, with a melting point of approximately 185° C. (degrees Celsius). Polyacrylonitrile fibers also exhibit good tensile strength and resilience.

For purposes of this application, "pitch" is the name for any of a number of highly viscous liquids which appear solid at room temperature and include a mixture of predominantly aromatic and alkyl-substituted aromatic hydrocarbons. Pitch may be made from petroleum products or plants. Petroleum-derived pitch is also called bitumen, while pitch produced from plants is also known as resin. Preferably, the pitch polymer comprises a mesophase pitch. When heated, pitch materials form an isotropic mass. As heating continues, spherical bodies begin to form. The spherical bodies are of an anisotropic liquid-crystalline nature. These spheres continue to grow and coalesce until a dense continuous anisotropic phase forms, which phase has been termed the "mesophase." Thus, the mesophase is the intermediate phase or liquid crystalline region between the isotropic pitch and the semi-coke obtainable at higher temperatures. Mesophase pitch suitable for certain embodiments disclosed herein may be extracted from natural pitch. For example, mesophase pitch may be solvent extracted from isotropic pitch containing mesogens as described in U.S. Pat. No. 5,032,250, the contents of which are hereby incorporated by reference. U.S. Pat. Nos. 4,277,324 and 4,208,267 also describe processes for obtaining mesophase pitch by treating isotropic pitch; the contents of each are hereby incorporated by reference. An isotropic pitch comprises molecules which are not aligned in optically ordered crystals and mesogens are mesophase-forming materials or mesophase precursors.

In other alternative embodiments, polyphenylene sulfide may be substituted for the melt-spinnable PAN. Polyphenylene sulfide (PPS) is considered as an important high-temperature polymer because it exhibits a number of desirable properties. For instance, polyphenylene sulfides desirably exhibit resistance to heat, acids and alkalis, to mildew, to bleaches, aging, sunlight, and abrasion. In one alternative embodiment, the continuous carbon nanofiber comprises a long-chain synthetic polysulfide in which at least 85% to about 99% of the sulfide linkages are attached directly to two aromatic rings. In particular embodiments, a polyarylene sulfide resin composition may be substituted for the PAN. For instance, the resin composition may include at least 70 mole % of p-phenylene sulfide units (e.g., 70 mole % to 100 mole % or 80 mole % to 90 mole %). In such compositions, the balance or remaining 30 mole % may include any combination of an alkyl or an alkoxy group having from 1 to 12 carbon atoms, a phenyl group and a nitro group. In various embodiments, the resin compositions may also include metal hydroxides and/or iron oxides. Suitable resin compositions are provided in U.S. Pat. No. 5,021,497, the contents of which are hereby incorporated by reference.

The nanostructure(s) 54, such as the nanotube(s) 58, carbon nanotube(s) 60, or other suitable nanostructure, act as an orientation template 74 (see FIG. 2) for orientation or orienting of the one or more first polymer(s) 66, and in particular, the polymer chains of the first polymers 66, in a direction 76 (see FIG. 2) that is parallel or substantially parallel to a direction (D) 78 (see FIG. 1A) of the longitudinal axis 32 of the fiber 30. Further, the carbon nanotubes 60 may act as crystalline microstructures of the one or more first polymer(s) 66 in a direction 76 that is parallel or substantially parallel to the longitudinal axis 32 of the fiber 30. In particular, the addition of the nanostructure(s) 54, such as the nanotube(s) 58, carbon nanotube(s) 60, or other suitable nanostructure(s), to the inner-volume portion 44, such as in the form of the inner core portion 46, of the fiber 30, acts to orient the PAN molecules to provide higher stiffness and strength than available from known fibers containing PAN alone. Further, the nanostructure(s) 54, such as the nanotube(s) 58, carbon nanotube(s) 60, or other suitable nanostructure(s), may act as nucleating agents for polymer crystallization. Thus, the templating or orientation effect of the nanostructure(s) 54, such as the nanotube(s) 58, carbon nanotube(s) 60, or other suitable nanostructure(s), enables an ordered, crystalline microstructure as compared to known fibers that may have an amorphous microstructure in the core portion of the fiber.

As shown in FIGS. 1A-1B, the fiber 30 further comprises an outer-volume portion 80, preferably in the form of an outer sheath portion 82 (see FIG. 3). As shown in FIG. 1B, outer-volume portion 80 comprises a second outer diameter ($d_2$) 84. The second outer diameter ($d_2$) 84 of the outer-volume portion 80 of the fiber 30 may be varied to fit a desired need or to provide desired properties. For example, the second outer diameter ($d_2$) 84 may preferably range in length from about 2 micrometers to about 50 micrometers; may more preferably range from about 5 micrometers to about 10 micrometers; or may most preferably range about 5 micrometers to about 7 micrometers, or may have another suitable length.

As shown in FIG. 1B, the outer-volume portion 80 of the fiber 30 may further comprise an inner-wall portion 86, and an outer-wall portion 88 having an outer surface 90. As further shown in FIG. 1B, the outer-volume portion 80 may further comprises a body portion 92 formed between the inner-wall portion 86 and the outer-wall portion 88. As shown in FIG. 1A, the outer-volume portion 80 is preferably in contact with and completely encompasses the inner-volume portion 44. Preferably, the outer-volume portion 80 cylindrically encompasses the inner-volume portion 44. The inner-volume portion 44 preferably has at least one of a tensile modulus 94 (see FIG. 2) and a strength 95 (see FIG. 2) that are higher than at least one of a tensile modulus 96 (see FIG. 2) and a strength 97 (see FIG. 2) of the outer-volume portion 80, and in particular, at the outer surface 90 of the outer-volume portion 80. Preferably, the fiber 30 has gradient properties 98 (see FIG. 2) that vary from the tensile modulus 94 and/or the strength 95 that are preferably higher in the inner-volume portion 44 to the tensile modulus 96 and/or the strength 97 that are preferably lower at the outer-volume portion 80, and in particular, at the outer surface 90 of the outer-volume portion 80. This results in the fiber 30 having an improved resistance 102 (see FIG. 3) to microfracture formation 104 (see FIG. 3) at a fiber-matrix interface 106 (see FIG. 3) between the outer surface 90 of the outer-volume portion 80 of the fiber 30 and a resin matrix 108 (see FIG. 3) cured or coupled to the fiber 30.

As shown in FIG. 2, the outer-volume portion 80 of the fiber 30 further comprises one or more second polymer(s) 110. As shown in FIG. 3, the second polymer 110 preferably comprises a polymer such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. The first polymer 66 and the second polymer 110 may each comprise the identical or same polymer. Alternatively, the first polymer 66 and the second polymer 110 may each comprise a different polymer from the same, e.g., identical, polymer or polymer family.

Figure 4:
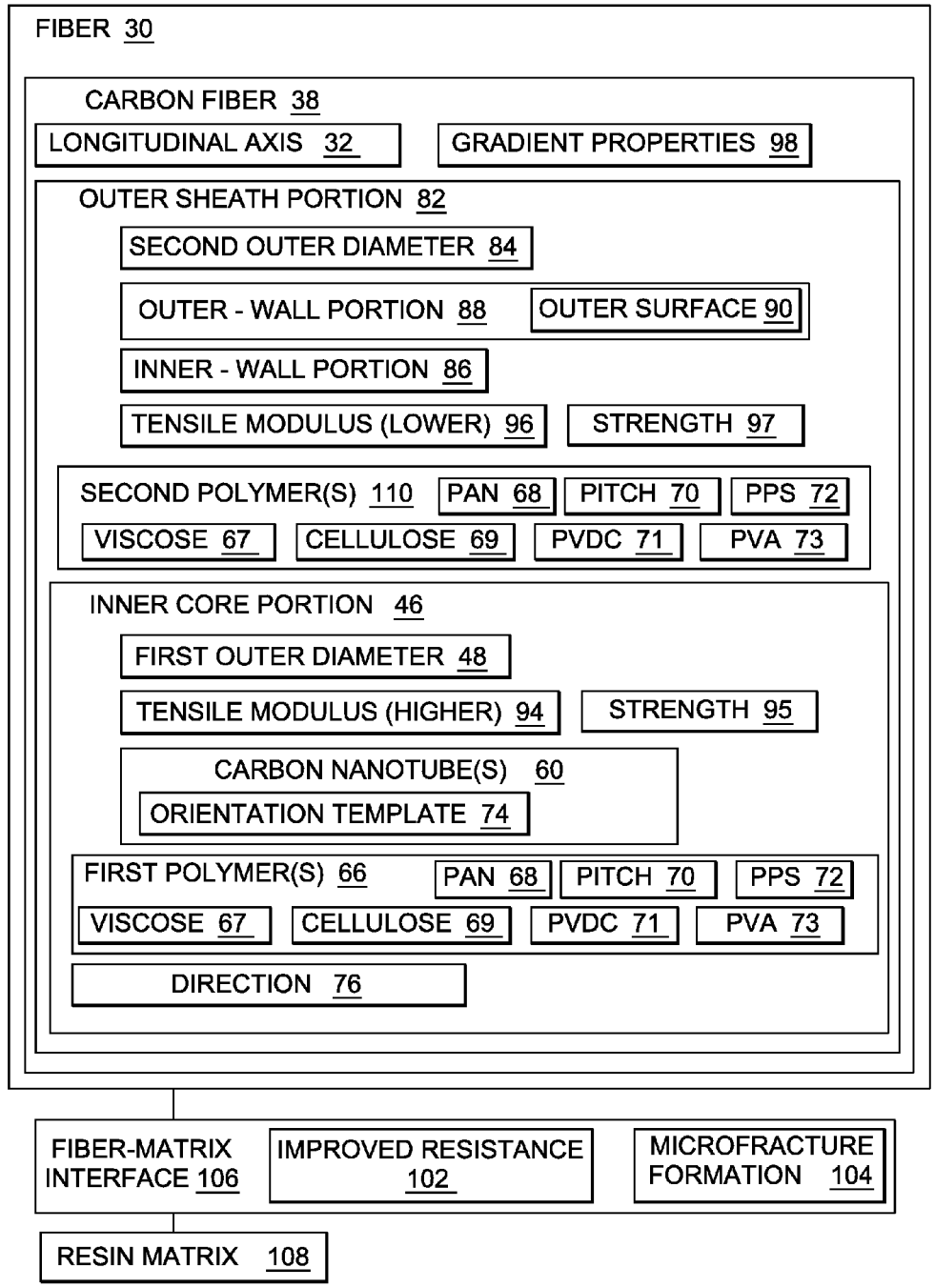
FIG. 4 is an illustration of a block diagram of another one of the embodiments of a fiber of the disclosure.

In another embodiment of the disclosure, as shown in FIG. 4, there is provided a carbon fiber 38. FIG. 4 is an illustration of a block diagram of another one of the embodiments of a fiber 30 in the form of the carbon fiber 38. As shown in FIG. 4, the carbon fiber 38 comprises an inner core portion 46 having a first outer diameter ($d_1$) 48 (see FIG. 1B) and having a plurality of carbon nanotubes 60 and a plurality of first polymers 66. The carbon nanotubes 60 act as an orientation template 74 for orientation of the first polymer(s) 66 in a direction 76 parallel or substantially parallel to the longitudinal axis 32 of the carbon fiber 38. Further, the carbon nanotubes 60 may act as crystalline microstructures of the first polymer(s) 66 in the direction 76 parallel or substantially parallel to the longitudinal axis 32 of the carbon fiber 38. The carbon fiber 38 further comprises an outer sheath portion 82 having a second outer diameter ($d_2$) 84 (see FIG. 1B) and having a plurality of second polymers 110. The outer sheath portion 82 is preferably in contact with and cylindrically encompasses the inner core portion 46. As shown in FIG. 4, the inner core portion 46 preferably has at least one of a tensile modulus 94 and a strength 95 that are higher than at least one of a tensile modulus 96 and a strength 97 of the outer sheath portion 82, and in particular, at the outer surface 90 of the outer-wall portion 88 of the outer sheath portion 82. The first polymer 66 and the second polymer 110 may each comprise the identical or same polymer. Alternatively, the first polymer 66 and the second polymer 110 may each comprise a different polymer from a same polymer family. The first polymer 66 and the second polymer 110 may each comprise a polymer, as discussed above and as shown in FIG. 3, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. As shown in FIG. 4, the carbon fiber 38 preferably has gradient properties 98 that vary from the tensile modulus 94 and/or the strength 95 that are preferably higher in the inner core portion 46 to a tensile modulus 96 and/or the strength 97 that are preferably lower at an outer sheath portion 82, and in particular, at an outer surface 90 of the outer-wall portion 88 of the outer sheath portion 82. This preferably results in the carbon fiber 38 having an improved resistance 102 to microfracture formation 104 at a fiber-matrix interface 106 between the carbon fiber 38 and a resin matrix 108.

Figure 5:
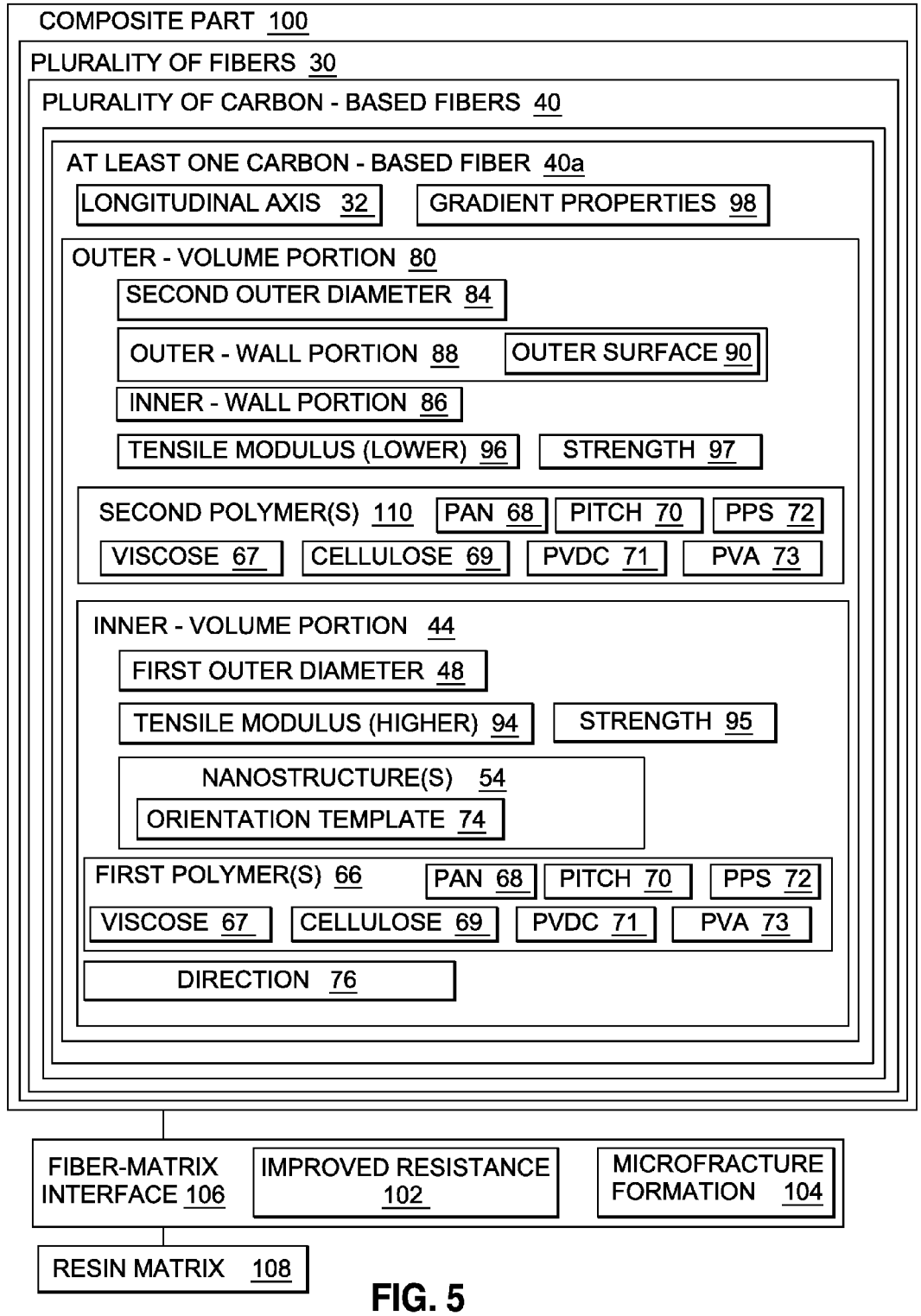
FIG. 5 is an illustration of a block diagram of one of the embodiments of a composite part having one of the embodiments of a fiber of the disclosure.

In another embodiment of the disclosure, as shown in FIG. 5, there is provided a composite part 100. FIG. 5 is an illustration of a block diagram of one of the embodiments of the composite part 100 comprising a plurality of fibers 30, preferably in the form of a plurality of carbon-based fibers 40. At least one of the carbon-based fibers 40a comprises an inner-volume portion 44 having a first outer diameter ($d_1$) 48 (see FIG. 1B) and having one or more nanostructure(s) 54 or a plurality of nanostructures 54 and one or more first polymer(s) 66. The nanostructure(s) 54 act as an orientation template 74 for orientation of the one or more first polymer(s) 66 in a direction 76 parallel or substantially parallel to the longitudinal axis 32 of the at least one carbon-based fiber 40a. Further, the nanostructure(s) 54 may act as crystalline microstructures of the one or more first polymer(s) 66 in the direction 76 parallel or substantially parallel to the longitudinal axis 32 of the at least one carbon-based fiber 40a. As shown in FIG. 5, the at least one carbon-based fiber 40a further comprises an outer-volume portion 80 having a second outer diameter ($d_2$) 84 (see FIG. 1B) and having one or more second polymer(s) 110. The outer-volume portion 80 is preferably in contact with and completely encompasses the inner-volume portion 44. As shown in FIG. 5, the inner-volume portion 44 preferably has at least one of a tensile modulus 94 and a strength 95 that are higher than at least one of a tensile modulus 96 and a strength 97 of the outer-volume portion 80, and in particular, at the outer surface 90 of the outer-wall portion 88 of the outer-volume portion 80.

As shown in FIG. 5, the composite part 100 further comprises a resin matrix 108 cured to the plurality of carbon-based fibers 40 and cured to the at least one carbon-based fiber 40a. The first polymer 66 and the second polymer 110 may each comprise the identical or same polymer. Alternatively, the first polymer 66 and the second polymer 110 may each comprise a different polymer from the same polymer family. The first polymer 66 and the second polymer 110 may each comprise a polymer, as discussed above and as shown in FIG. 3, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer. The nanostructure(s) 54 may preferably comprise carbon nanostructure(s) 56 (see FIG. 3), nanotube(s) 58 (see FIG. 3), carbon nanotube(s) 60 (see FIG. 3), halloysite nanotube(s) 62 (see FIG. 3), boron nitride nanotube(s) 64 (see FIG. 3), or another suitable nanostructure that promotes templating of a precursor polymer. The at least one carbon-based fiber 40a preferably has gradient properties 98 that vary from the tensile modulus 94 and/or the strength 95 in the inner-volume portion 44 to the tensile modulus 96 and/or the strength 97 at the outer-volume portion 80, and in particular, at the outer surface 90 of the outer-wall portion 88 of the outer-volume portion 80. This preferably results in the at least one carbon-based fiber 40*a* having an improved resistance 102 to microfracture formation 104 at a fiber-matrix interface 106 between the at least one carbon-based fiber 40*a* and a resin matrix 108.

Figure 6:
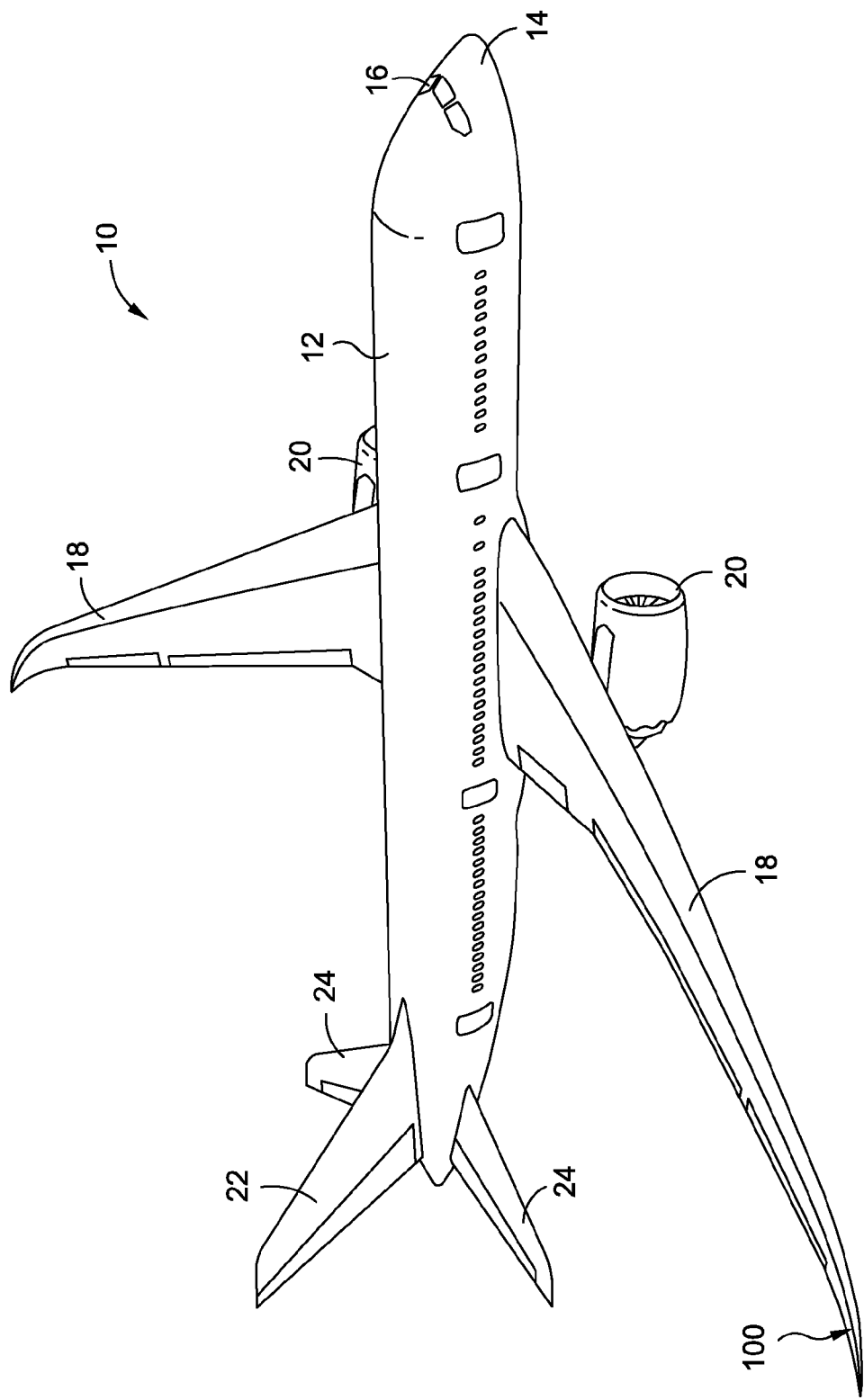
FIG. 6 is an illustration of a perspective view of an exemplary aircraft that may incorporate a composite part having one or more advantageous embodiments of a fiber of the disclosure.

FIG. 6 is an illustration of a perspective view of an exemplary aircraft 10 that may incorporate a composite part 100 (see also FIG. 5) having one or more advantageous embodiments of the fiber 30 (see FIGS. 1A-5) as disclosed herein. As shown in FIG. 6, the aircraft 10 comprises a fuselage or body 12, a nose 14, a cockpit 16, wings 18 operatively coupled to the fuselage or body 12, one or more propulsion units 20, a tail vertical stabilizer 22, and one or more tail horizontal stabilizers 24. Although the aircraft 10 shown in FIG. 6 is generally representative of a commercial passenger aircraft, composite parts, such as composite part 100 for the wing 18 having one or more fibers 30 (see FIGS. 1A-5), may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of the assemblies, methods, and systems in accordance with the disclosure may be utilized in other transport vehicles, such as boats and other watercraft, trains, automobiles, trucks, buses, or other suitable transport vehicles. It may further be appreciated that embodiments of the assemblies, methods, and systems in accordance with the disclosure may be used in various composite structures having one or more of the fibers 30.

Figure 7:
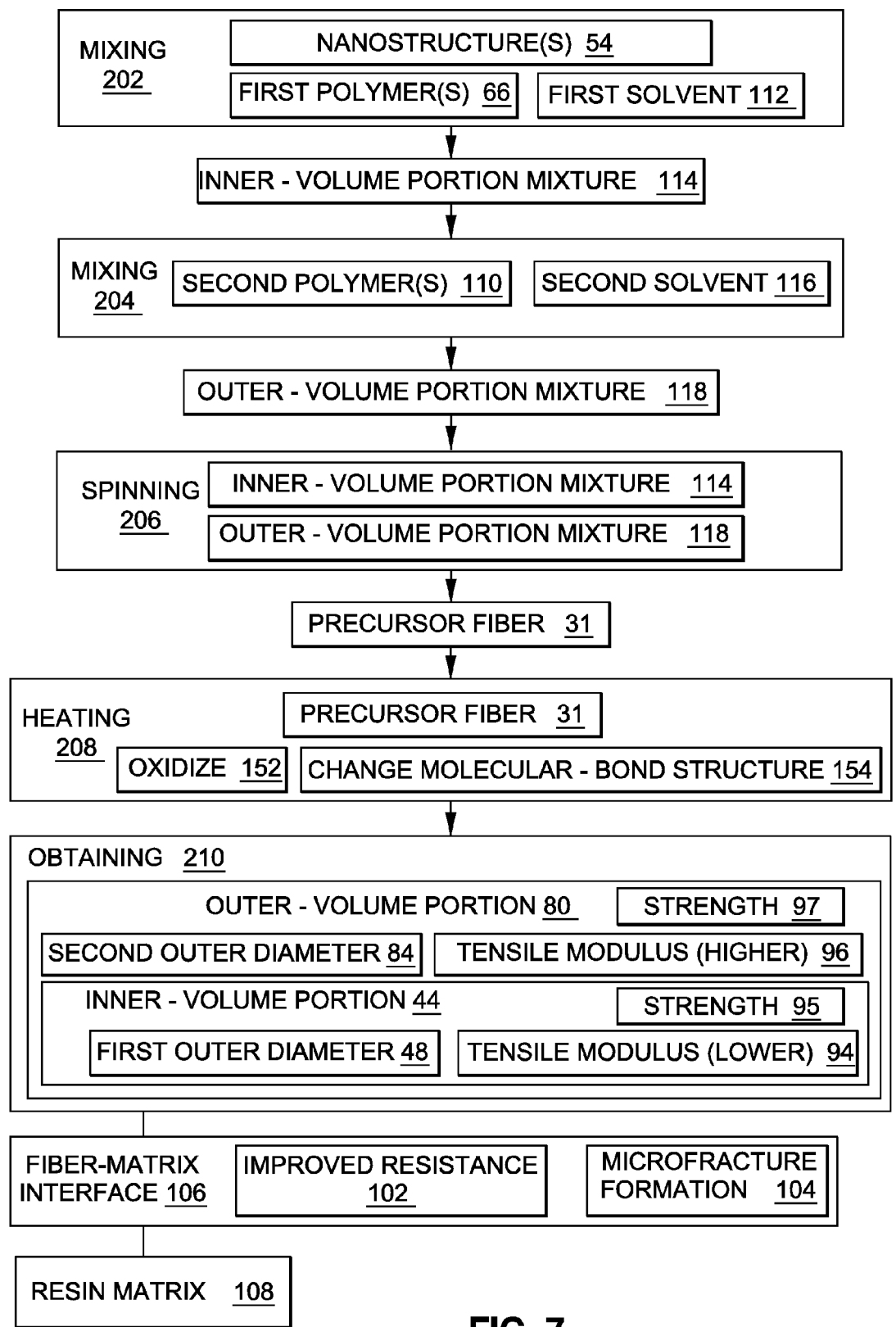
FIG. 7 is an illustration of a schematic diagram of an exemplary embodiment of a method of the disclosure.
Figure 8:
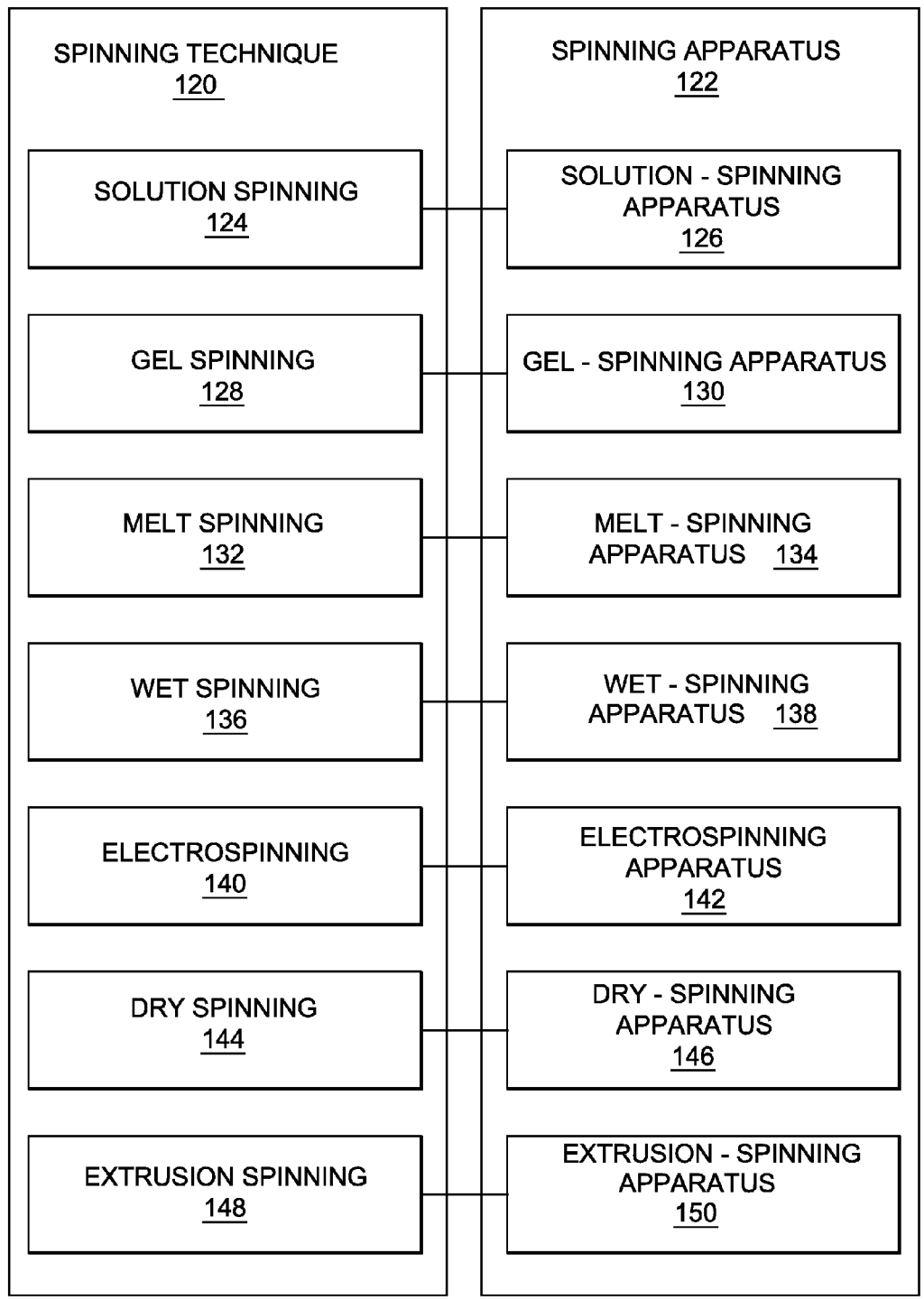
FIG. 8 is an illustration of a block diagram of exemplary embodiments of spinning techniques and spinning apparatuses that may be used in embodiments of the disclosed method of the disclosure; and, FIG. 9 is an illustration of a flow diagram of an exemplary embodiment of a method of the disclosure.
Figure 9:
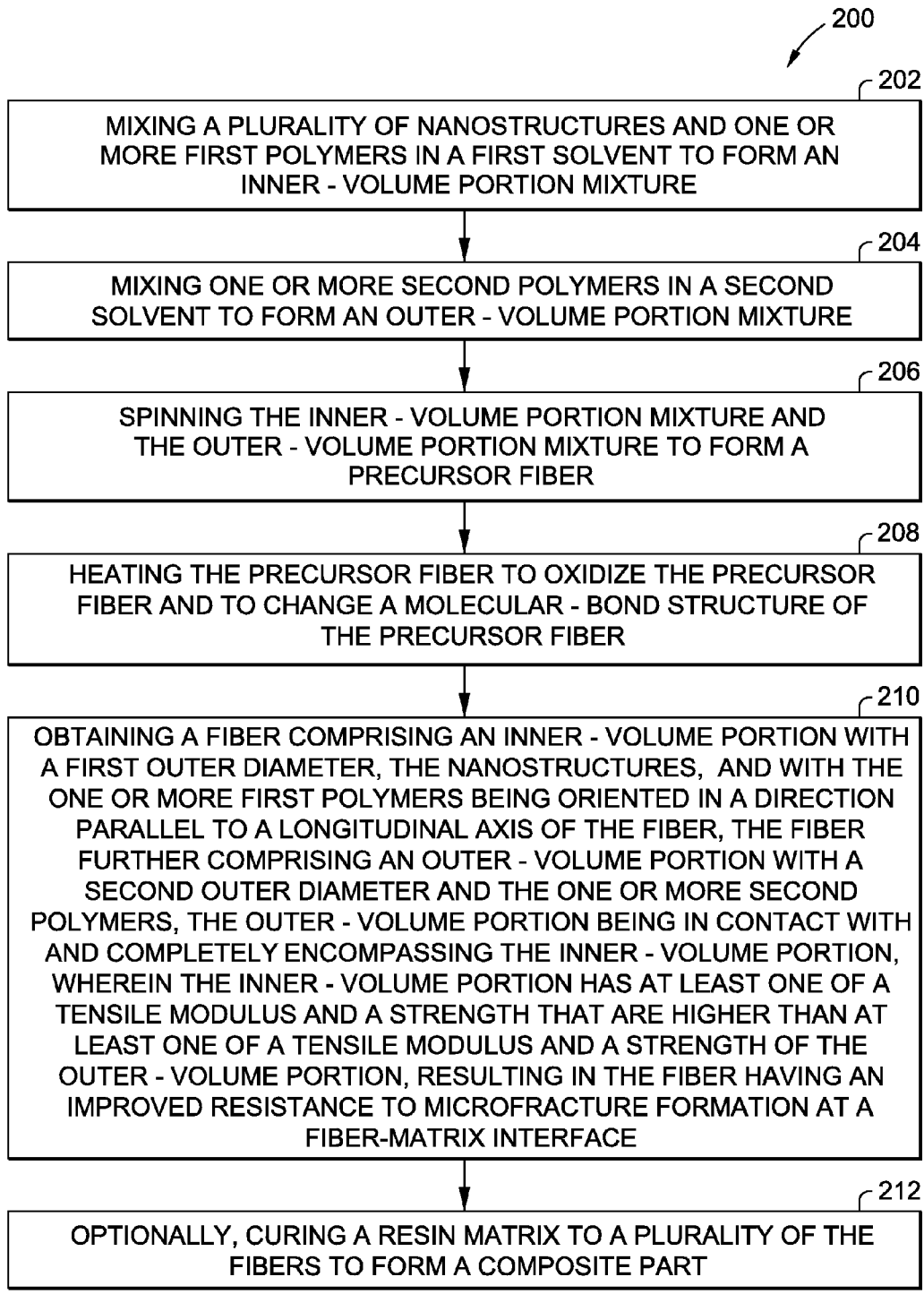

In another embodiment of the disclosure, as shown in FIGS. 7-9, there is provided a method 200 of making a fiber 30 (see FIGS. 1A-6) having improved resistance 102 (see FIG. 7) to microfracture formation 104 (see FIG. 7) at a fiber-matrix interface 106 (see FIG. 7). FIG. 7 is an illustration of a schematic diagram of an exemplary embodiment of the method 200 of the disclosure. FIG. 8 is an illustration of a block diagram of exemplary embodiments of spinning techniques 120 and spinning apparatuses 122 that may be used in embodiments of the disclosed method 200 of the disclosure. FIG. 9 is an illustration of a flow diagram of an exemplary embodiment of the method 200 of the disclosure.

As shown in FIGS. 7 and 9, the method 200 comprises step 202 of mixing one or more nanostructure(s) 54 or a plurality of nanostructures 54 (see FIG. 7) and one or more first polymer(s) 66 (see FIG. 7) in a first solvent 112 (see FIG. 7) to form an inner-volume portion mixture 114 (see FIG. 7). The nanostructure(s) 54 may preferably comprise carbon nanostructure(s) 56 (see FIG. 3), nanotube(s) 58 (see FIG. 3), carbon nanotube(s) 60 (see FIG. 3), halloysite nanotube(s) 62 (see FIG. 3), boron nitride nanotube(s) 64 (see FIG. 3), or another suitable nanostructure that promotes templating of a precursor polymer.

As shown in FIGS. 7 and 9, the method 200 further comprises step 204 of mixing one or more second polymer(s) 110 (see FIG. 7) in a second solvent 116 (see FIG. 7) to form an outer-volume portion mixture 118 (see FIG. 7). The first polymer 66 and the second polymer 110 may each comprise the identical or same polymer. Alternatively, the first polymer 66 and the second polymer 110 may each comprise a different polymer from the same polymer family. The first polymer 66 and the second polymer 110 may each comprise a polymer, as discussed above and as shown in FIG. 3, such as polyacrylonitrile (PAN) 68, pitch 70, polyphenylene sulfide (PPS) 72, viscose 67, cellulose 69, polyvinylidene chloride (PVDC) 71, polyvinyl alcohol (PVA) 73, combinations thereof, or another suitable polymer.

The first solvent 112 and the second solvent 116 may each comprise an identical or same solvent. Alternatively, the first solvent 112 and the second solvent 116 may each comprise a different solvent. The first solvent 112 and the second solvent 116 may each comprise a solvent such as dimethylacetamide (DMAc), dimethylformamide (DMF), dimethylsulfoxide (DMSO), dimethyl sulfone (DMSO$_2$), ethylene carbonate, propylene carbonate (PPC), chloroacetonitrile, dimethyl phosphate (DDVP), acetic anhydride (Ac$_2$O), or another suitable solvent.

As shown in FIGS. 7-9, the method 200 further comprises step 206 of spinning the inner-volume portion mixture 114 and the outer-volume portion mixture 118 to form a precursor fiber 31. Spinning may comprise a known spinning technique 120 (see FIG. 8) using a known spinning apparatus 122 (see FIG. 8). For example, as shown in FIG. 8, the spinning technique 120 may comprise solution spinning 124 using a solution-spinning apparatus 126, gel spinning 128 using a gel-spinning apparatus 130, melt spinning 132 using a melt-spinning apparatus 134, wet spinning 136 using a wet-spinning apparatus 138, electrospinning 140 using an electrospinning apparatus 142, dry spinning 144 using a dry-spinning apparatus 146, extrusion spinning 148 using an extrusion-spinning apparatus 150, and combinations thereof, or another suitable spinning process.

As shown in FIGS. 7 and 9, the method 200 further comprises step 208 of heating the precursor fiber 31 to oxidize 152 the precursor fiber 31 and to change a molecular-bond structure 154 of the precursor fiber 31. For example, the precursor fibers 31 may be subjected to carbonization comprising the heating of the oxidized precursor fibers to a temperature ranging from about 600 degrees Celsius to about 3000 degrees Celsius.

As shown in FIGS. 7 and 9, the method 200 further comprises step 210 of obtaining a fiber 30 comprising an inner-volume portion 44 with a first outer diameter ($d_1$) 48 (see FIG. 1B), the nanostructure(s) 54, and with the one or more first polymer(s) 66 being oriented in a direction 76 parallel to a longitudinal axis 32 of the fiber 30. The fiber 30 further comprises an outer-volume portion 80 with a second outer diameter ($d_2$) 84 (see FIG. 1B) and the one or more second polymer(s) 110. The outer-volume portion 80 is preferably in contact with and completely encompasses the inner-volume portion 44. As shown in FIG. 7, the inner-volume portion 44 preferably has at least one of a tensile modulus 94 and a strength 95, i.e., a tensile modulus and/or a strength, that are higher than at least one of a tensile modulus 96 and a strength 97, i.e., a tensile modulus and/or a strength, of the outer-volume portion 80, and in particular, of the outer surface 90 of the outer-wall portion 88 of the outer-volume portion 80. This preferably results in the fiber 30 having an improved resistance 102 to microfracture formation 104 at a fiber-matrix interface 106 between the fiber 30 and a resin matrix 108. The fiber 30 may preferably comprise a carbon fiber 38 (see FIG. 3), a carbon-based fiber 40 (see FIG. 3) such as a graphite fiber 42 (see FIG. 3), or another suitable fiber.

As shown in FIG. 9, the method 200 further optionally comprises step 212 of curing a resin matrix 108 to a plurality of the fibers 30 to form a composite part 100 (see FIGS. 5-6).

In various embodiments of the method 200 disclosed herein, the first polymer 66 and the second polymer 110 typically are selected to have melting temperatures such that the first and second polymers 66, 110, respectively, may be spun at a polymer throughput that enables the spinning of the components through a common capillary at substantially the same temperature without degrading one of the components. Following extrusion through a die, the resulting thin fluid strands, or filaments, may remain in a molten state for some distance before they are solidified by cooling in a surrounding fluid medium, which may be chilled and air blown through the strands. Once solidified, the filaments may be taken up on a godet or other take-up surface. For continuous filaments, the strands may be taken up on a godet that draws down the thin fluid streams in proportion to the speed of the take-up godet.

Continuous-filament fiber may further be processed into staple fiber. In processing staple fibers, large numbers, e.g., 1,000 strands to 100,000 strands, of continuous filament may be gathered together following extrusion to form a tow for use in further processing, as is known in that art. The use of such tows is likewise known in continuous-filament applications, as well. A finish solution may optionally be applied, to aid in fiber processing, as is known in the art. Such finish solution may be chosen so as not to interfere with downstream processes such as extraction and various heat treatments.

According to certain embodiments, a heightened molecular alignment may be achieved while producing the carbon-nanotube-reinforced fibers due to the geometric constraints imposed during spinning. These constraints are preferably greater than those realized when producing larger-diameter fibers. Additionally, the spinneret of the spinning technique and spinning apparatus may be designed to allow for the tailoring of filament diameter and/or wall thickness. As such, a whole range of properties may be achieved.

Polymer-distribution technology allowing the economical production of micro- and nano-sized fibers may use techniques similar to printed-circuit-board technology to manufacture the spin-pack components. These precise components may then be used to accurately distribute polymers in an extremely small area available in the spin pack. Such spin packs allow for the economical and practical production of micro- and nano-sized fibers. Such spin-packs may be provided by Hills, Inc. of West Melbourne, Fla.

According to various alternative embodiments, the melt-spinnable PAN may be replaced with other polymers such as pitch (preferably mesophase pitch) or polyphenylene sulfide (PPS). In one such embodiment, carbon nanotubes may be blended into molten pitch at or slightly above its softening temperature. The blend is then heated to an extrusion temperature which can be about 20 degrees Celsius to about 30 degrees Celsius above the softening temperature and a pitch fiber may be extruded by melt spinning as discussed herein. The pitch-based fiber, having carbon nanotubes, may next be oxidized and then carbonized.

Disclosed embodiments of the fiber 30 and method 200 provide a core-sheath fiber wherein both the inner core portion 46 and the outer sheath portion 82 are made from the same polymer material, preferably, polyacrylonitrile (PAN) 68 (see FIG. 3). A novel feature is that in the inner core portion 46, the PAN 68 contains nanostructure(s) 54, such as nanotube(s) 58, carbon nanotube(s) 60 (see FIG. 3), or another nanostructure. The nanostructure(s) 54, such as nanotube(s) 58, carbon nanotube(s) 60 (see FIG. 3), or another nanostructure, act as an orientation template 74 (see FIG. 3) to orient molecules of the PAN 68 in order to provide higher stiffness and strength as compared to known fibers having PAN alone.

Further, the templating or orientation effect of the nanostructure(s) 54, such as nanotube(s) 58, carbon nanotube(s) 60 (see FIG. 3) or another nanostructure act, enables an ordered, crystalline microstructure, as compared to known fibers that may have an amorphous microstructure in the core portion of the fiber. In addition, disclosed embodiments of the fiber 30 and method 200 provide a core-sheath fiber with improved strength and stiffness at a reduced weight with little or no effect on cost. Use of nanostructures in the inner-volume portion 44, such as the inner core portion 46, aligns polymer chains of the one or more first polymers 66 to create a higher stiffness in the inner-volume portion 44 and a lower stiffness at the outer surface 90 of the outer-wall portion 88 of the outer-volume portion 80 of the fiber 30. Thus, any possible mismatch at the fiber-matrix interface 106 between the stiffness of the resin matrix 108 and the stiffness of the fiber 30 is minimized or eliminated. Disclosed embodiments of the fiber 30 and method 200 provide a core-sheath nanofiber that is functionally graded and preferably has gradient properties 98 that vary from the tensile modulus 94 and/or the strength 95 in the inner-volume portion 44 to the tensile modulus 96 and/or the strength 97 in the outer-volume portion 80, and in particular, at the outer surface 90 of the outer-wall portion 88 of the outer-volume portion 80 of the fiber 30.

This effect is achieved by combining core-sheath spinning with template orientation by the nanostructure(s) 54 in the inner-volume portion 44 of the fiber 30. Thus, the fiber-matrix interface 106 properties of tensile modulus, tensile strength, stiffness, and other properties are improved at the fiber-matrix interface 106. This results in improved resistance of the fiber 30 to microfracture formation 104 at the fiber-matrix interface 106 between the fiber 30 and a resin matrix 108.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:
1. A continuous-filament finished fiber consisting of:
an inner-volume portion having a first outer diameter and having a plurality of nanostructures selected from the group consisting of nanotubes, carbon nanotubes, halloysite nanotubes, and boron nitride nanotubes, and having a first polymer selected from the group consisting of polyacrylonitrile (PAN), pitch, polyphenylene sulfide (PPS), viscose, cellulose, polyvinylidene chloride (PVDC), and polyvinyl alcohol (PVA), the nanostructures substantially aligned along a longitudinal axis of the continuous-filament finished fiber and polymer chains of the first polymer oriented in a direction parallel to the longitudinal axis of the continuous-filament finished fiber; and,
an outer-volume portion having a second outer diameter and having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer-volume portion being in contact with and completely encompassing the inner-volume portion,
wherein the inner-volume portion has a greater tensile modulus and/or tensile strength than the outer-volume portion, and further wherein the first polymer and the second polymer are identical polymers.

2. The continuous-filament finished fiber of claim 1 wherein the polymer chains of the first polymer that are oriented in the direction parallel to the longitudinal axis of the continuous-filament finished fiber create a higher stiffness in the inner-volume portion and a lower stiffness at the outer surface of the outer-volume portion of the continuous-filament finished fiber.

3. The continuous-filament finished fiber of claim 1 wherein the first outer diameter has a length in a range of from about 2 micrometers to about 50 micrometers, and the second outer diameter has a length in a range of from about 2 micrometers to about 50 micrometers, wherein the length of the second outer diameter is greater than the length of the first outer diameter.

4. The continuous-filament finished fiber of claim 1 wherein the first polymer and the second polymer are polyacrylonitrile (PAN).

5. The continuous-filament finished fiber of claim 1 wherein each continuous-filament finished fiber is a carbon fiber or a carbon-based fiber.

6. The continuous-filament finished fiber of claim 1 wherein the first polymer and the second polymer are a melt-processable/spinnable polyacrylonitrile (PAN) or a solution spinnable polyacrylonitrile (PAN).

7. The continuous-filament finished fiber of claim 1 wherein each continuous-filament finished fiber has gradient properties that vary from the tensile modulus and the tensile strength that are higher in the inner-volume portion to the tensile modulus and the tensile strength that are lower at the outer-volume portion and that result in the continuous-filament finished fiber having an improved resistance to microfracture formation at a fiber-matrix interface between the continuous-filament finished fiber and a resin matrix, as compared to a continuous-filament finished fiber having an inner-volume portion with one or more first polymers and an outer-volume portion with one or more second polymers, each of the first polymers and the second polymers being an identical polymer or polymers, and the continuous-filament finished fiber not having nanostructures in the inner-volume portion that act as a nucleating agent for orientation of the first polymers in the inner-volume portion.

8. A continuous-filament finished carbon fiber consisting of:
an inner core portion having a plurality of carbon nanotubes and a first polymer selected from the group consisting of polyacrylonitrile (PAN), pitch, polyphenylene sulfide (PPS), viscose, cellulose, polyvinylidene chloride (PVDC), and polyvinyl alcohol (PVA), the carbon nanotubes substantially aligned along a longitudinal axis of the continuous-filament finished carbon fiber and polymer chains of the first polymer oriented in a direction parallel to the longitudinal axis of the continuous-filament finished carbon fiber; and,
an outer sheath portion having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer sheath portion being in contact with and cylindrically encompassing the inner core portion,
wherein the inner core portion has a greater tensile modulus and/or tensile strength than the outer sheath portion, and further wherein the first polymer and the second polymer are identical polymers.

9. The continuous-filament finished carbon fiber of claim 8 wherein the polymer chains of the first polymer that are oriented in the direction parallel to the longitudinal axis of the continuous-filament finished fiber create a higher stiffness in the inner core portion and a lower stiffness at the outer surface of the outer sheath portion of each continuous-filament finished carbon fiber.

10. The continuous-filament finished carbon fiber of claim 8 wherein the first polymer and the second polymer are polyacrylonitrile (PAN).

11. The continuous-filament finished carbon fiber of claim 8 wherein the first polymer and the second polymer are polyphenylene sulfide (PPS).

12. The continuous-filament finished carbon fiber of claim 8 wherein the continuous-filament finished carbon fiber has gradient properties that vary from the tensile modulus and the tensile strength that are higher in the inner core portion to the tensile modulus and the tensile strength that are lower at the outer sheath portion and that result in the continuous-filament finished carbon fiber having an improved resistance to microfracture formation at a fiber-matrix interface between the continuous-filament finished carbon fiber and a resin matrix, as compared to a continuous-filament finished carbon fiber having an inner core portion with a plurality of first polymers and an outer sheath portion with a plurality of second polymers, each of the first polymers and the second polymers being a same polymer, and the continuous-filament finished carbon fiber not having carbon nanotubes in the inner core portion that act as a nucleating agent for orientation of the first polymers in the inner core portion.

13. A composite part comprising:
a plurality of continuous-filament finished carbon-based fibers, at least one continuous-filament finished carbon-based fiber consisting of:
an inner-volume portion having a first outer diameter and having a plurality of nanostructures selected from the group consisting of nanotubes, carbon nanotubes, halloysite nanotubes, and boron nitride nanotubes, and having a first polymer selected from the group consisting of polyacrylonitrile (PAN), pitch, polyphenylene sulfide (PPS), viscose, cellulose, polyvinylidene chloride (PVDC), and polyvinyl alcohol (PVA), the nanostructures substantially aligned along a longitudinal axis of the continuous-filament finished carbon-based fiber and polymer chains of the first polymer oriented in a direction parallel to the longitudinal axis of the continuous-filament finished carbon-based fiber; and,
an outer-volume portion having a second outer diameter and having a second polymer selected from the group consisting of polyacrylonitrile (PAN), pitch, polyphenylene sulfide (PPS), viscose, cellulose, polyvinylidene chloride (PVDC), and polyvinyl alcohol (PVA), the outer-volume portion being in contact with and completely encompassing the inner-volume portion,
wherein the inner-volume portion has a greater tensile modulus and/or tensile strength than the outer-volume portion, and further wherein the first polymer and the second polymer are identical polymers; and,
a resin matrix cured to the plurality of continuous-filament finished carbon-based fibers to form the composite part.

14. The composite part of claim 13 wherein the first polymer and the second polymer are polyacrylonitrile (PAN).

15. The composite part of claim 13 wherein the at least one continuous-filament finished carbon-based fiber has gradient properties that vary from the tensile modulus and the tensile strength that are higher in the inner-volume portion to the tensile modulus and the tensile strength that are lower at the outer-volume portion and that result in the continuous-filament finished carbon-based fiber having an improved resistance to microfracture formation at a fiber-matrix interface between the continuous-filament finished fiber and a resin matrix, as compared to a continuous-filament finished carbon-based fiber having an inner-volume portion with one or more first polymers and an outer-volume portion with one or more second polymers, each of the first polymers and the second polymers being a same polymer, and the continuous-filament finished carbon-based fiber not having nanostructures in the inner-volume portion that act as a nucleating agent for orientation of the first polymers in the inner-volume portion.

16. The composite part of claim 13 wherein the first polymer and the second polymer are a melt-processable/spinnable polyacrylonitrile (PAN) or a solution spinnable polyacrylonitrile (PAN).

\* \* \* \* \*